United States Patent
Colby et al.

(10) Patent No.: US 10,717,248 B2
(45) Date of Patent: Jul. 21, 2020

(54) METHODS FOR FORMING A RETREADED TIRE

(71) Applicants: E. Bruce Colby, Greenville, SC (US); Metodi L. Ikonomov, Clermont-Ferrand (FR); Dimitri G. Tsihlas, Greer, SC (US); Michael Widmyer, Duncan, SC (US); Cesar E. Zarak, Simpsonville, SC (US)

(72) Inventors: E. Bruce Colby, Greenville, SC (US); Metodi L. Ikonomov, Clermont-Ferrand (FR); Dimitri G. Tsihlas, Greer, SC (US); Michael Widmyer, Duncan, SC (US); Cesar E. Zarak, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 335 days.

(21) Appl. No.: 14/915,022

(22) PCT Filed: Aug. 30, 2013

(86) PCT No.: PCT/US2013/057726
§ 371 (c)(1),
(2) Date: Feb. 26, 2016

(87) PCT Pub. No.: WO2015/030825
PCT Pub. Date: Mar. 5, 2015

(65) Prior Publication Data
US 2016/0207267 A1 Jul. 21, 2016

(51) Int. Cl.
*B29D 30/54* (2006.01)
*B29D 30/56* (2006.01)
(Continued)

(52) U.S. Cl.
CPC ........... *B29D 30/54* (2013.01); *B29D 30/542* (2013.01); *B29D 30/56* (2013.01); *B29D 30/68* (2013.01);
(Continued)

(58) Field of Classification Search
CPC . B60C 11/02; B60C 11/0323; B60C 11/1259; B60C 11/1272; B60C 11/24;
(Continued)

(56) References Cited

U.S. PATENT DOCUMENTS

| 1,877,988 | A | 9/1932 | Schrank |
| 2,143,528 | A | 1/1939 | Thomas |

(Continued)

FOREIGN PATENT DOCUMENTS

| DE | 1228525 B | * 11/1966 | ......... B29C 37/0082 |
| DE | 10309759 A1 | 1/2005 | |

(Continued)

OTHER PUBLICATIONS

Gottfried Reuter, DE 1228525, English translation. (Year: 1966).*
(Continued)

*Primary Examiner* — Robert C Dye
*Assistant Examiner* — Sedef E Paquette
(74) *Attorney, Agent, or Firm* — Hahn Loeser & Parks LLP; Bret A. Hrivnak

(57) ABSTRACT

The invention includes methods for forming a retreaded tire, and treads there for. Particular embodiments of such methods provide a tire tread, the tire tread having a bottom side and a top side configured for engaging a ground surface, a thickness extending between the top side and the bottom side, and a pair of opposing lateral sides defining a width of the tread, the bottom side having one or more submerged voids extending from the bottom side into the tread thickness to form a tread pattern, the submerged voids having a (Continued)

depth less than the thickness and the top side being free of any exposed voids comprising a groove. Further steps include applying the tire tread to a tire carcass, curing the tire tread to the tire carcass, and forming one or more voids into the tread thickness the top side of the tread after the step of bonding.

19 Claims, 4 Drawing Sheets

(51) Int. Cl.
*B29D 30/68* (2006.01)
*B60C 11/02* (2006.01)
(52) U.S. Cl.
CPC ........ B60C 11/02 (2013.01); *B29D 2030/541* (2013.01); *B29D 2030/544* (2013.01)
(58) Field of Classification Search
CPC ..... B60C 2011/0353; B60C 2011/0355; B60C 2011/0365; B60C 2011/0367; B60C 2011/0376; B60C 2011/0379; B29D 30/54; B29D 30/542; B29D 30/56; B29D 30/68; B29D 2030/061; B29D 2030/0612; B29D 2030/1671; B29D 2030/3071; B29D 2030/541; B29D 2030/544; B29D 2030/685
USPC .............................. 156/110.1, 96, 128.1, 909
See application file for complete search history.

(56) References Cited

U.S. PATENT DOCUMENTS

| | | | |
|---|---|---|---|
| 2,966,936 A | 1/1961 | Schelkmann | |
| 3,739,662 A | 6/1973 | Windelman et al. | |
| 3,850,222 A * | 11/1974 | Lejuene | B29D 30/68 157/13 |
| 3,919,020 A * | 11/1975 | Floto | B29D 30/54 156/95 |
| 3,963,066 A | 6/1976 | Schwartz et al. | |
| 4,237,955 A * | 12/1980 | Clayton | B29D 30/68 157/13 |
| 4,979,549 A | 12/1990 | Kaneko | |
| 5,275,218 A * | 1/1994 | Nakayama | B29D 30/542 152/209.17 |
| 5,603,366 A | 2/1997 | Nakayama et al. | |
| 5,668,731 A * | 9/1997 | Mancosu | B23K 26/0823 157/13 |
| 6,619,351 B2 | 9/2003 | Rayman | |
| 7,208,110 B2 | 4/2007 | Lopez et al. | |
| 7,252,728 B2 | 8/2007 | Weydert et al. | |
| 8,298,463 B2 | 10/2012 | Kost | |
| 2009/0199944 A1 * | 8/2009 | Goto | B60C 11/02 152/209.17 |
| 2011/0214789 A1 | 9/2011 | Cress et al. | |
| 2012/0097300 A1 * | 4/2012 | Colby | B29D 30/56 152/154.2 |
| 2012/0103486 A1 | 5/2012 | Colby | |
| 2012/0103489 A1 | 5/2012 | Colby | |
| 2016/0082782 A1 * | 3/2016 | Seto | B60C 13/001 152/524 |
| 2016/0121655 A1 * | 5/2016 | Okado | B60C 5/14 152/510 |

FOREIGN PATENT DOCUMENTS

| | | |
|---|---|---|
| EP | 1275527 A2 | 2/2005 |
| EP | 2086736 A1 | 8/2009 |
| EP | 2285596 B1 | 11/2011 |
| FR | 858389 A | 11/1940 |
| FR | 2548097 A1 | 1/1985 |
| GB | 2061837 A | 5/1981 |
| JP | H05169913 A | 7/1993 |
| JP | H07108607 B2 | 11/1995 |
| JP | 2013014215 A | 1/2013 |
| NO | 00/00357 A1 | 1/2000 |
| NO | 2013095406 A1 | 6/2013 |
| WO | 2011002445 A1 | 1/2011 |
| WO | 2011002448 A1 | 1/2011 |
| WO | 2012091836 A1 | 7/2012 |
| WO | 2013066309 A1 | 5/2013 |
| WO | WO-2015003827 A1 * | 1/2015 ......... B60C 11/0323 |

OTHER PUBLICATIONS

Rittweger Stefan, WO-2015003827-A1, machine translation. (Year: 2015).*

PCT/US2013/057726 International Search Report and Written Opinion dated Jan. 22, 2014, 15 pages.

* cited by examiner

METHODS FOR FORMING A RETREADED TIRE

This application is a National Stage application of International Application No. PCT/US2013/057726, filed Aug. 30, 2013.

BACKGROUND OF THE INVENTION

1. Field of the Invention

This invention relates generally to methods and apparatus for manufacturing retreaded tires, and treads for retreading tires. More specifically, this invention relates to methods and apparatus for molding tire treads for a retreaded tire having submerged voids that appear after the retreaded tire has worn a significant amount and a top side that is substantially free of grooves, the methods further including forming voids along the top side of the tread subsequent to bonding the tread to the tire carcass.

2. Description of the Related Art

A retreaded tire consists of a new tread that is attached to a previously existing tire carcass. The carcass is prepared to receive the new tread by removing the prior tread, such as through buffing operations. The new tread is then applied to the tire carcass and is cured to secure the new tread to the carcass. Methods of curing retreaded tires include placing a retreaded tire at least partially within a flexible curing membrane to create a sealed fluid chamber between the curing membrane and the tire. The combination of a retreaded tire with an installed curing membrane is referred to herein as a tire-membrane assembly.

In operation, a plurality of tire-membrane assemblies are placed within a tire curing chamber, such as an autoclave. Each tire-membrane assembly is then placed in fluid communication with a manifold via a fluid passage. The manifold provides a source of pressure or vacuum for use by each fluid passage during particular stages of a retreaded tire curing process, as a pressure source and a vacuum source are operably connected to the manifold.

During a retread curing operation, that is, in preparation for and during a retread curing process (i.e., a curing cycle), each tire-membrane assembly may at certain instances be placed under vacuum. While under vacuum the curing chamber is also positively pressurized, such that a pressure force is applied to the flexible curing membrane. Accordingly, the flexible curing membrane is forced into grooves and other sufficiently sized voids arranged along the top side (i.e., outer or exposed side) of the tread during curing operations. Because these flexible curing membranes are used to separately cure numerous retreaded tires, the membranes undergo numerous flexing cycles due to the repeated penetration of grooves and sufficiently sized voids arranged along the top side of the tread, which can notably reduce the useful life of the flexible curing membrane. Therefore, there is a need to increase the life of a curing membrane. Furthermore, by having voids arranged along the top side of the tread, certain instabilities may arise and act on the tread, which may require further attention in maintaining proper alignment of the tread relative the tire carcass during retreading operations. Furthermore, the curing membrane may tend to compress the tread, which may alter the cured dimensions of the tread. Therefore, there is also a need to improve the retreading process by reducing any instabilities or deforming forces acting on or impacting the tread.

It is also known to form retreaded tire treads having one or more submerged voids arranged along a bottom side of any such tread, each submerged void being open to the bottom side and recessed or submerged below the outer, ground-engaging surface such that the submerged void is substantially hidden from view in the top side of the tread but later becomes exposed when a predetermined thickness of tread has been worn away. In such instances, any such submerged void may provide additional tread void and/or traction edges for enhanced tire performance at worn stages of the tire tread. Also, having submerged voids arranged along the bottom side extends the useful life of the tread, in lieu of having voids extend to a depth above the bottom side, since the remaining depth of the tread would not include any voids and therefore would be generally unusable.

It is also known that these submerged voids may be pre-formed prior to applying the tread to a tire carcass by a tread molding operation. A pre-formed tread cured prior to application to a tire carcass is referred to as a pre-cured tread. When a tread is pre-formed, the submerged tread voids may be formed along and into or through the bottom side (that is, underside) of the tread, the bottom side being the side of the tread that will later be bonded to the tire casing. In such instances, the submerged void is open to the bottom side of the tread, and therefore, the submerged void is also open to a bonding surface of the tire carcass.

However, when pre-cured treads having top side grooves or other voids also include submerged voids arranged along the bottom side of the tread, such as grooves and/or sipes, the tread become less rigid or stiff. This can render the tread more difficult to handle due to the ease in which the tread flexes. For example, this may render more difficult tread alignment relative the tire carcass. Therefore, there is a need to provide more rigid treads for the purpose of improved handling thereof during tire treading operations.

Furthermore, it is generally impractical to form full-depth voids in pre-cured treads when one or more full-depth voids parse the tread into multiple pieces, which obviously impacts the handling and alignment of the tread relative the tire carcass during retread operations. And even when not molding a full-depth void, when molding voids along both sides of the tread, due to manufacturing tolerances and mold pressure issues, it is difficult to precisely mold top and bottom voids in close proximity.

SUMMARY OF THE INVENTION

Particular embodiments of the invention include methods of forming a retreaded tire, a retreaded tire formed by such methods, and a tire tread for use in such methods. Particular embodiments of such methods include providing a tire tread, the tire tread having a bottom side configured for bonding to a tire carcass, a top side configured for engaging a ground surface, a thickness extending between the top side and the bottom side, and a pair of opposing lateral sides defining a width of the tread, the bottom side having one or more submerged voids extending from the bottom side into the tread thickness to form a tread pattern, each of the one or more submerged voids having a depth less than the thickness and the top side being free of any exposed voids comprising a groove, each of the one or more submerged voids also being configured to be exposed along the top side when the tire is in a worn configuration during the useful life of the tire tread. Further steps of such methods include applying the tire tread to a tire carcass, where a layer of bonding material is arranged between the tire tread and the tire carcass, bonding the tire tread to the tire carcass, and forming one or more voids into the tread thickness along the top side of the tread after the step of bonding.

Particular embodiments of the inventive tire tread for retreading a tire carcass include a bottom side configured for bonding to a tire carcass, a top side configured for engaging a ground surface, the top side being free of any exposed voids. Such treads further include a thickness extending between the top side and the bottom side, and a pair of lateral sidewalls defining a width of the tread. Furthermore, such treads include one or more submerged voids extending into the tread thickness from the bottom side towards the top side forming a tread pattern, each of the one or more submerged voids having a depth less than the thickness of the tire tread, each of the one or more submerged voids also being configured to be exposed along the top side when the tire is in a worn configuration during the useful life of the tire tread.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

DETAILED DESCRIPTION OF PARTICULAR EMBODIMENTS

Figure 1:
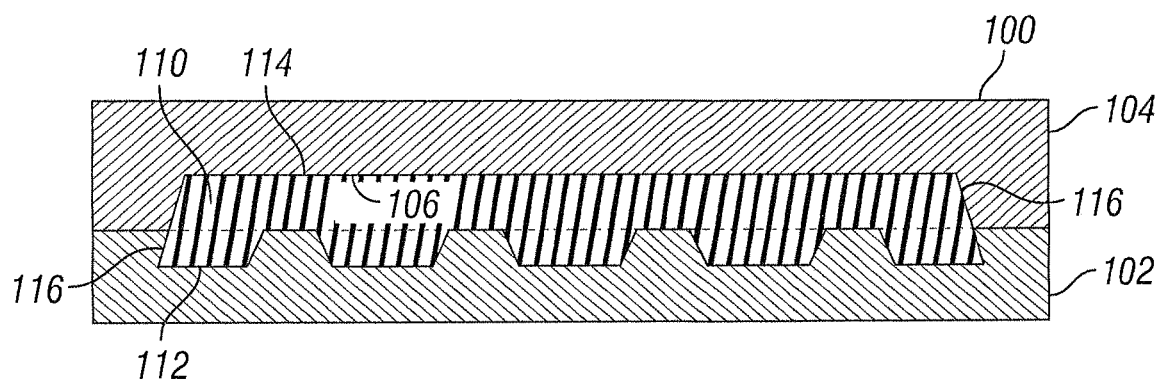
FIG. 1 is a cutaway end view of a tire tread in a tire mold, in accordance with an embodiment of the invention.

Particular embodiments of the invention provide a tire tread, tires incorporating such treads, and methods for forming a retreaded tire.

Disclosed in this application is a method for forming a retreaded tire. The method includes the step of providing a tire tread. The tread includes a bottom side configured for bonding to a tire carcass and a top side configured for engaging a ground surface, the top side also being referred to as an outer or exterior side of the tread The tread further includes a thickness extending between the top side and the bottom side, and a pair of opposing lateral sides defining a width of the tread. The bottom side has one or more submerged voids arranged along the bottom side and extending into the tread thickness from the bottom side, the one or more submerged voids being configured to be exposed along the top side when the tire is in a worn configuration during the useful life of the tire tread. It is noted that a "submerged" void is a void extending into the tread thickness form the bottom side and terminating at a location within the tread thickness below the top side. In other words, a submerged void is offset below the top side of the tread within the tread thickness by a desired depth or distance. Accordingly, a submerged void has a depth less than the tread thickness.

It is noted that, in particular embodiments, the one or more submerged voids are arranged to form a tread pattern, which is a predetermined arrangement of submerged voids to provide a particular volumetric void ratio, surface void ratio, and arrangement of void and contact surfaces along the width and length of the tread. Volumetric void ratio is the ratio of volumetric void available at a particular worn depth of the tread relative to the total volume of the tread at the particular worn depth—where the total volume includes both void and tread material available. Surface void ratio is the ratio of surface void arranged along the top side of the tread at a particular worn depth of the tread relative to the total surface area available of the tread at the particular worn depth—where the total area includes both void and tread areas arranged along the top side.

In particular embodiments, the top side of the tread provided is free of any exposed voids comprising a groove, although the top side may include any shallow and/or narrow void. In such instances, the aim is to provide a top side that is generally free of any void into which a flexible curing membrane may substantially extend, so to generally reduce the amount of flexing experienced by the membrane in each curing operation for the purpose of extending the life of the flexible curing membrane. Such shallow and/or narrow voids may comprise surface texturing, sipes, and any other shallow void or narrow void sufficiently shallow and/or narrow to achieve any of the intended purposes of the invention as discussed herein. In any embodiment, a sufficiently narrow void prevents notable or substantial penetration of the flexible curing membrane into the void depth. For example, in different exemplary embodiments, a sufficiently narrow void has a dimension transverse to the tread thickness (such as a width) equal to or less than 3 mm, equal to or less than 2 mm, or equal to or less than 1 mm. In any embodiment, a sufficiently shallow void prevents notable or substantial flexing of the flexible curing membrane by not providing a substantial void depth into which the flexible membrane would otherwise penetrate and extend. For example, in different exemplary embodiments, a sufficiently shallow void has a depth equal to or less than 3 mm, equal to or less than 2 mm, or equal to or less than 1 mm.

In even more specific embodiments, the top side is free of substantially all voids, including grooves and sipes. In such embodiments, the aim is to provide a more rigid tread for the purpose of improving the handling of the tread during retreading operations and/or to reduce any instabilities acting on the tread during retreading operations by virtue of a flexible curing membrane. In certain embodiments, it is also an aim to facilitate the formation of any arrangement of voids along a top side as desired using a common pre-cured tread having a common arrangement of one or more submerged voids.

As used in this application, the term "void" is generally defined as a discontinuity extending within a thickness of the tread, such as a sipe or a groove, regardless of whether the void is arranged along the top side or the bottom side or whether the void is a submerged void. A sipe is a narrow groove or slit, usually having a width equal to or less than 2 millimeters (mm) or equal to or less than 1 mm, for example. In its narrowest form, a sipe may form a slice in the tread thickness. In particular embodiments, a sipe is described as having a width that allows the sipe to close or collapse, or to remain substantially closed, when traveling through a tire footprint (where the tire engages the ground), even though any the sides of the sipe may shift or otherwise distort relative each other.

It is also noted that an arrangement of grooves generally define a tread element, such as a rib or a tread lug. A rib is defined as a mass of tread material extending continuously along a length of the tread, such that when the tread is arranged annularly around the tire carcass, the rib extends continuously around the circumference of the tire. If a rib is discontinuous, it is referred to as a tread lug, which is a block of tread material.

It is also appreciated that a void may have a length extending in any direction along the tread length and/or width. For example, the void may be a longitudinal or lateral groove or sipe. Longitudinal grooves generally extend in a direction of the tread length, which may extend circumferentially around the tire when the tread is arranged around the tire carcass. It is also contemplated that a longitudinal groove may extend at an angle biased to a circumferential direction of the tire when installed on the tire. Lateral grooves generally extend in a direction of the tread width, where the lateral groove extends in a direction perpendicular to a longitudinal centerline of the tread (which extends in a direction of the tread length), or at an angle biased to the longitudinal centerline. It is appreciated that the length of any void may extend along any linear or non-linear path as desired.

Particular embodiments of such methods further include a step of applying the tread to a tire carcass where a layer of bonding material is arranged between the tire tread and the tire carcass. In doing so, a retreaded tire is assembled. During retreading operations, the tire tread (i.e., the "retread") is arranged upon the tire carcass. When the tire tread comprises a strip of tread, such as when molded in a flat mold, for example, the tread is wrapped around the tire carcass. When the tire tread is an annular tread band, the tread band is positioned around the tire carcass, where the tire carcass is arranged within a central opening of the tread band. It is appreciated that the bonding layer may comprise any bonding material known to one of ordinary skill used for bonding the pre-cured tire tread to a tire carcass. For example, the bonding material may comprise any elastomeric or polymeric material, such as natural or synthetic rubber, which is curable and promotes bonding by way of cross-linking. In particular embodiments, in performing the step of assembling, the bonding layer comprises uncured bonding material.

Further embodiments of such methods include a step of bonding, or curing, the tread to the tire carcass. It is appreciated that any known method for curing the tread to the tire carcass may be employed. In particular embodiments, for example, a flexible curing membrane is arranged along the top side of the tire tread such that during a step of bonding or curing, the flexible membrane extends into the void from the top side to forcefully engage and displace the frangible connector downward into the void in a direction toward the bottom side. In arranging a flexible curing membrane about at least a portion of the tread of the assembled retreaded tire to form a sealed fluid chamber between the flexible curing membrane and the tire (including the tire tread). When assembled, the flexible curing membrane and the tire form a tire-membrane assembly. It is appreciated that the flexible curing membrane maintains proper alignment of the new tread relative to the tire carcass. The membrane also facilitates a pressure differential between the membrane compartment (and the sealed tire assembly) and a curing chamber of the curing vessel, within which the tire-membrane assembly is arranged to cure the tread to the tire carcass by application of heat and/or pressure according to any desired curing law.

It is appreciated that the flexible curing membrane may comprise any flexible membrane for curing a tire that is known to one of ordinary skill in the art, which may comprise one or more curing membranes arranged about the tire. For example, a membrane may extend substantially around the entire tire, the membrane comprising one or more sections. By further example, the assembled retreaded tire may be mounted on a wheel and one or more curing membranes arranged to extend from the wheel and about assembled retread tire and the tread arranged thereon. In such example, an flexible curing membrane extends along the top side of the tire tread and down each of the pair of tire carcass sidewalls to engage the wheel to form a sealed fluid chamber between the membrane and the tire along the tread and sidewalls. A second sealed fluid chamber is then formed between the interior side of the tire carcass and the wheel.

The retread curing process is performed generally within a curing vessel, such as, for example, an autoclave. The curing vessel generally includes a curing chamber providing a controlled environment in which the tire-membrane assembly cured. Generally during the curing process, the chamber is pressurized to a desired pressure and heated to a desired temperature based upon a recipe or formula. In performing the step of bonding or curing, particular embodiments of such methods include placing the sealed fluid chamber of the tire-membrane assembly under substantial vacuum. This generally occurs at the beginning of the curing process, before pressure and heat is applied to the tire-membrane assembly in a curing chamber of a curing vessel. As used herein, "vacuum" or "under vacuum" means providing a fluid pressure equal to zero psia (pounds per square inch absolute), and "substantial vacuum" or "substantially under vacuum" means 5 to 0 (zero) psia. "Partial vacuum" connotes a pressure less than 14.7 psia, less than 10 psia, less than 8 psia, less than 5 psia, or less than 3 psia. Additional steps of such methods may further include connecting a fluid passage to the curing membrane of the tire-membrane assembly to place the sealed fluid chamber in fluid communication with a pressure source (configured to provide positive pressure and/or vacuum pressure as needed). A pressure source may comprise a compressor or any other device known to one of ordinary skill in the art.

Yet further embodiments of such methods include a step of forming one or more voids into the tread thickness along the top side of the tread after the step of bonding. Because, in various embodiments, the tread is originally provided without at least any grooves arranged along the top side of the tread, after the tread is bonded to the tire, such as after performing a curing operation, a desired arrangement of voids may be formed along the top side and into the thickness of the tread. For example, in particular embodiments, at least one groove or a plurality of grooves are formed into the top side. In further embodiments, at least one void or a plurality of voids, whether sipes and/or grooves, are formed into the top side—such as when the original tread provided was substantially free of voids. In particular embodiments, the one or more voids arranged along the top side form an arrangement of voids that differ from the arrangement of submerged voids along the bottom side. Still, while not necessary, in more specific embodiments, the one or more voids formed along the top side intersect the submerged voids such that the intersecting voids (that is, top and submerged voids) are in fluid communication with one another. In further embodiments, the one or more voids formed along the top side are arranged overtop so that each overlaps and is aligned with a corresponding submerged void, so to create a combined, full-depth void extending from the top side to the bottom side of the tread. In other words, the combined, full-depth void extends through the entire thickness of the tread. It is also noted, regardless as to whether any of the voids formed along the top side are in fluid communication with any submerged groove, in particular embodiments, the depth of the one or more voids formed along the top side overlap the depth of the one or more submerged voids extending into the tread thickness from the bottom side, such that any such void arranged along the top side extends into the tread thickness beyond a top end of any submerged void. By doing so, at least one of the one or more voids formed along the top side and of the one or more submerged voids are exposed to a worn top side of the tread. It is appreciated that in certain embodiments, an indicator, such as a shallow void or marking, is arranged along the top side of the tread to identify where any of the one or more voids are to be formed along the top side after curing. The indicator may also identify the type of void to be formed, such as a sipe or a groove, as well as the width and/or depth to be formed.

It is understood that this step of forming one or more voids into the tread thickness may be performed by any method using any tread removal member known to one of ordinary skill in the art. For example, in an exemplary embodiment, a tread removal member comprises an abrasion member employed to remove a thickness of the tread. In particular embodiments, the abrasion member is a rotary member, which rotates along a rotational axis and has an outer circumference formed of an abrasive material or having one or more cutting surfaces so to remove tread material as the rotary member rotates while engaging the tread. In another exemplary embodiment, a heated blade cuts into a thickness of the tread to remove a thickness of the tread. In any event, the tread removal member may be shaped to form a void having a desired shape reflecting the shape of the tread removal member.

Particular embodiments of the methods discussed above will now be described in further detail below in association with the figures filed herewith exemplifying the performance of the methods in association with particular embodiments of the tread.

Figure 2:
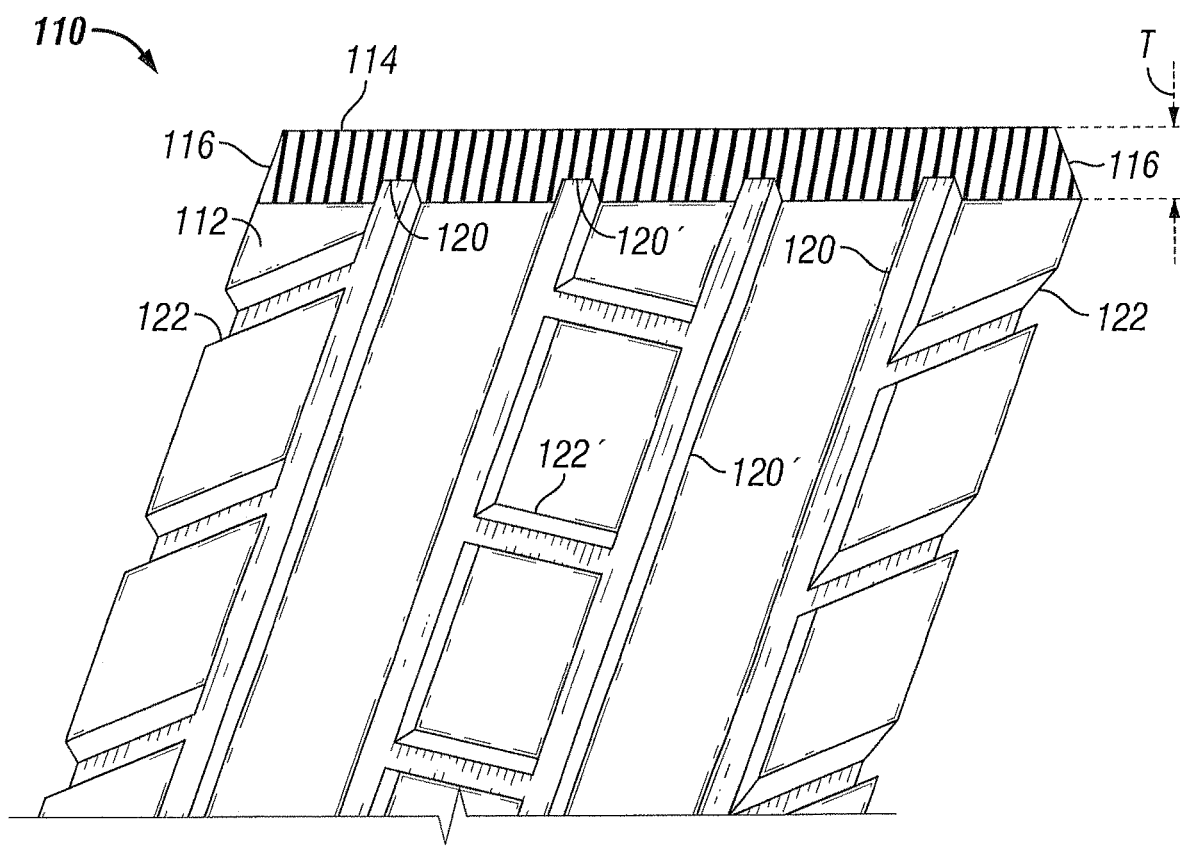
FIG. 2 is a perspective bottom view of the pre-cured tire tread of FIG. 1.

With reference to the exemplary embodiment of FIGS. 1 and 2, a mold 100 for forming an exemplary tire tread 110 according to the present invention is shown. The mold 100 includes a first mold member 102 and a second mold member 104 defining a molding cavity 106 in which a corresponding tread is formed. In the embodiment shown, first mold member 102 forms bottom side 112 of a tread 110 configured for bonding to a tire carcass while second mold member 104 forms a top side 114 of a tread 110 configured for engaging a ground surface. A thickness of the tread 110 extends between the bottom side 112 and top side 114. The tread 110 extends between opposing lateral sides 116, 116 defining a width of the tread.

It is noted that the top side 114 of the tread is free of voids comprising grooves. It is also noted that the top side 114 is substantially free of other voids, although the top side may include any shallow and/or narrow void as discussed herein. For example, these shallow and/or narrow voids may comprise surface texturing, sipes, and any other shallow void or narrow void sufficiently shallow and/or narrow to achieve any of the intended purposes of the invention as discussed herein. In other embodiments, the top side is substantially free of all voids.

With regard to the bottom side 112, it is shown to include a plurality of submerged voids 120, 122 comprising grooves extending into the tread. In particular, the plurality of voids 120, 122 include longitudinal grooves 120 and lateral grooves 122. In can be said that the arrangement of longitudinal grooves 120 and lateral grooves 122 define a tread pattern in the bottom side 112 of the tread 110, the tread pattern defining a desired volumetric void ratio and/or surface void ratio at a particular worn thickness of the tread thickness.

According to the exemplary embodiment, the longitudinal grooves 120 extend in a direction of the tread length and parallel or along a longitudinal centerline of the tread. Furthermore, the lateral grooves 122 are shown to extend between the opposing lateral sides 116, 116 of the tread 110 in a direction of the tread width and biased from at least one of the lateral sides 116, 116 of the tread and a longitudinal centerline of the tread, such that the lateral submerged groove 122 is in fluid communication with the exterior of the tread. Because the lateral grooves are also in fluid communication with the longitudinal grooves by virtue of the lateral and longitudinal grooves intersecting, the longitudinal grooves are also in fluid communication with the exterior of the tread.

The submerged voids 120, 122, as well as any top voids having a dimension transverse to the tread thickness equal to or less than 1 mm, may be formed by any process. In the exemplary embodiment shown, for example, the submerged voids are molded into the tread. In other embodiments, the submerged voids are formed by removing tread material from the tread, such as by abrading or cutting material from the tread. The tread 110 may be un-cured or pre-cured tread and, if pre-cured, the submerged voids 120, 122 may be formed in the tread either before or after curing.

Figure 3:
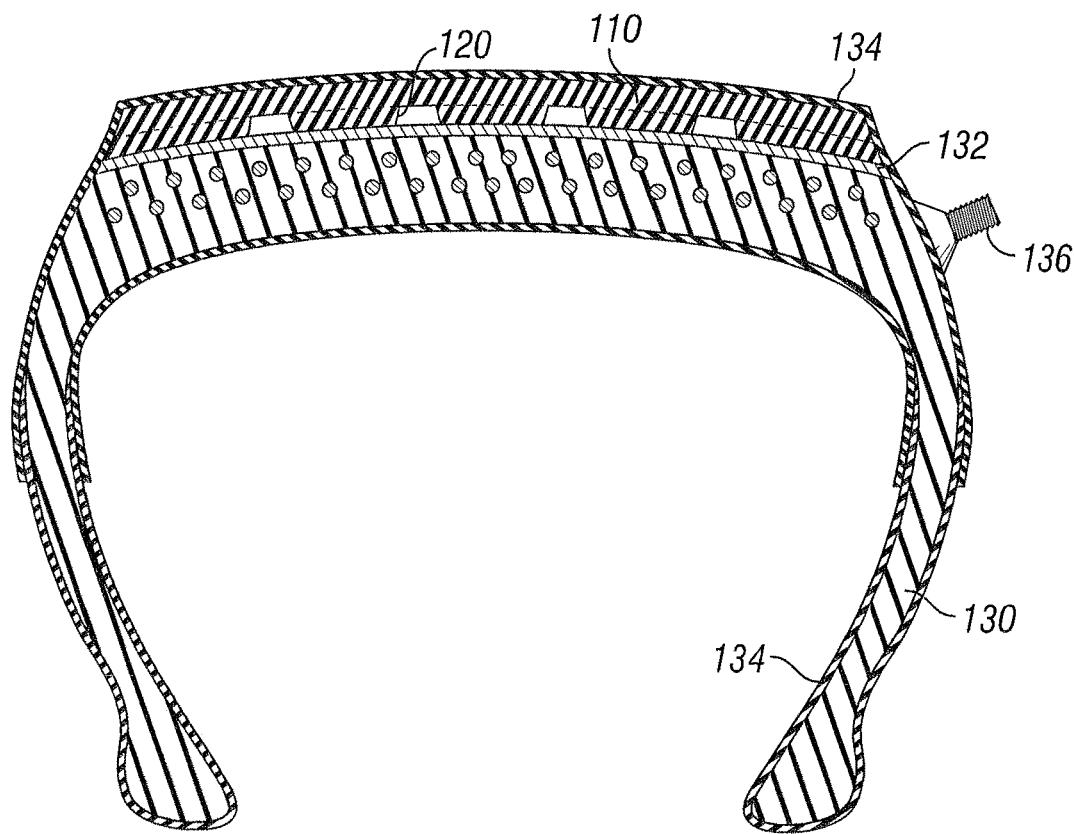
FIG. 3 is a front cross-sectional view of the tire tread of FIG. 1 arranged atop a tire carcass and a bonding layer to form an assembled retreaded tire, where a plurality of flexible curing membranes are arranged to surround the assembled retreaded tire for undergoing a curing operation, in accordance with an embodiment of the invention.

Once a tread has been formed, the tread is applied to a tire carcass. In the exemplary embodiment of FIG. 3, a tread 110 is shown applied to a tire carcass 130 such that the bottom side 112 of the tread is arranged atop a bonding layer 132 arranged between the tread and the tire carcass for the purpose of bonding the tread to the carcass. A curing membrane 134 is positioned at least partially around the tire carcass 130 and tread 110 such that the curing membrane extends along the top side of the tread to form a substantially air-tight enclosure referred to as a sealed fluid chamber. A port 136 is provided in the membrane 134 and is in fluid communication with a manifold (not shown) for removing fluid from the interior of the membrane 134 to from a substantial vacuum, and which may be employed to pressurize with a positive pressure as desired. Because the top side 114 does not contain any voids comprising grooves, the flexible curing membrane 134 does not substantially deform into the tread thickness during curing operations, which extends the life of the curing membrane. Ultimately, the tire tread 110 is cured or otherwise bonded to the tire carcass 130 by means well known to those having skill in the art.

Once the tire tread is bonded to the tire carcass and the flexible curing membrane removed, one or more voids (referred to as top side voids) are formed along the top side of the tread and into the tread thickness. It is appreciated that the step of forming one or more voids along the top side may form any arrangement of voids along the top side as desired, whether grooves or sipes, extending in a direction of the tread width or length, or at any angle biased thereto, which may result in a desired tread pattern. Furthermore, the voids may extend to any desired depth of the tread thickness. For example, with reference to FIG. 5, voids are formed into the tread 110, the voids comprising longitudinal grooves 140 and lateral grooves 142. In this exemplary embodiment, the top side voids 140, 142 extend to a depth $d_T$ into the tread thickness T sufficient to engage one or more submerged voids 120, 122 extending into the tread thickness by a depth $d_B$ from the bottom side 112 at an intersection location 144. In particular embodiments, this is most desirable when the submerge void to be engaged by a void formed along the top side is a submerged void that is not in fluid communication with a lateral side of the tread or otherwise is not in fluid communication with the exterior of the tread. Such a submerged void is referred to as an "unvented submerged void," where unvented submerged voids are provided at 120', 122'. Accordingly, by engaging an unvented void with a void formed along the top side, the void formed along the top side vents the submerged void by placing the submerged void in fluid communication with the exterior of the tread and tire. By doing so, the gases previously trapped within the submerged void are able to dissipate as necessary during tire operation—which allows any heated and/or pressurized gases to release during tire operation. It is also appreciated that the unvented submerged voids may be vented by arranging apertures in the tread thickness from the unvented submerged voids and to the top side of the tread or by arranging additional submerged voids extending from any unvented submerged void and the lateral side of the tread or any other void in fluid communication with an exterior side of the tread. Still, by forming any void along the top side to intersect a submerged void, improved venting may be achieved even venting is already provided.

Figure 5:
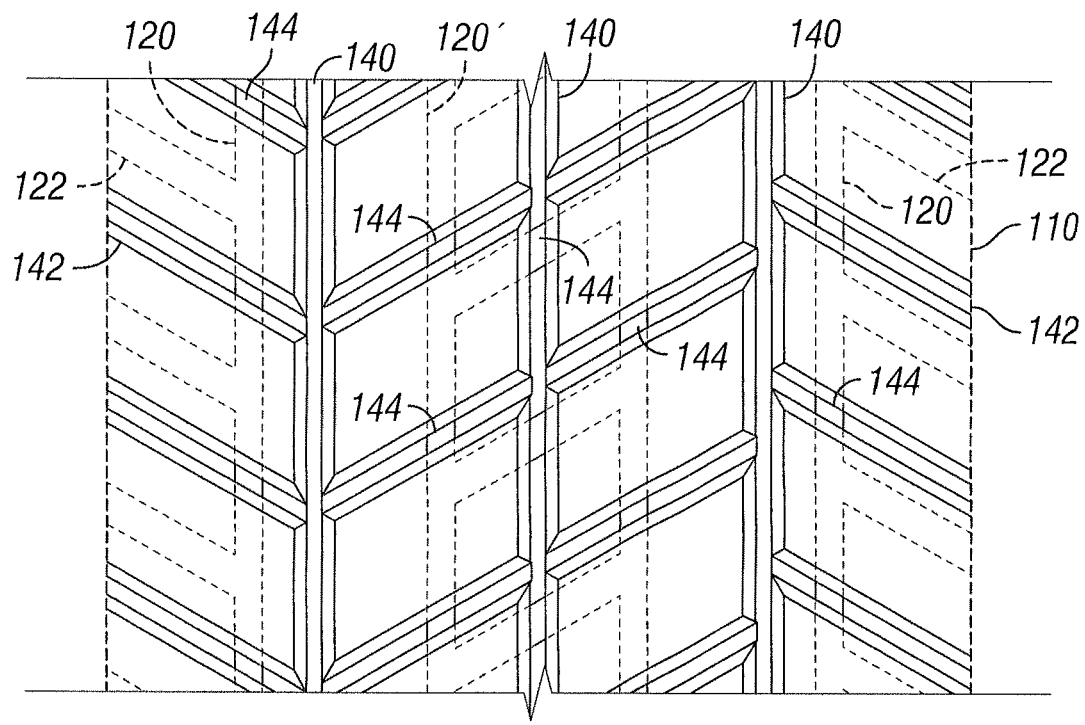
FIG. 5 is a top plan view of the tire tread of FIG. 4 after formation of voids in the top side in accordance with an embodiment of the invention.

It is appreciated that the top side voids formed along the top side may be misaligned with the submerged voids in a depthwise direction of the tread thickness, which is exemplarily shown in FIG. 5 where the top side voids 140, 142 are shifted in either or both a direction of the tread width or length (that is, in widthwise and lengthwise directions of the tread) to a location not entirely aligned overtop a submerged void. In such instances, the top side voids may or may not intersect the submerged voids. Still, it is also appreciated that one or more top side voids may be substantially aligned with (that is, overlap) a submerged void in a depthwise direction of the tread thickness, where the top side void is deemed to be substantially or completely arranged overtop the submerged void. In such instances, it is understood that the top side may or may not extend sufficiently into the tread thickness to intersect the submerged void, and thereby placing the submerged void in fluid communication with the top side void. In instances when a top side void is arranged overtop a submerged void and intersects the submerged void, a combined, full-depth void is formed comprising the depth of the top side void and the depth of the submerged void. In such instances, the combined, full-depth void is a full-depth void extending through the full thickness of the tread. In the exemplary embodiment of FIG. 6, combined, full-depth voids 146 are shown each formed by arranging a top side void 140 overtop a submerged void 120, 122, where the top side void also intersects the submerged void. In more specific embodiments, it is appreciated that a tread pattern formed in bottom side of the tread with one or more submerged voids may be replicated along the top side to form a single full-depth tread pattern of voids or of particular voids less than all arranged along the top or bottom side of the tread.

Figure 4:
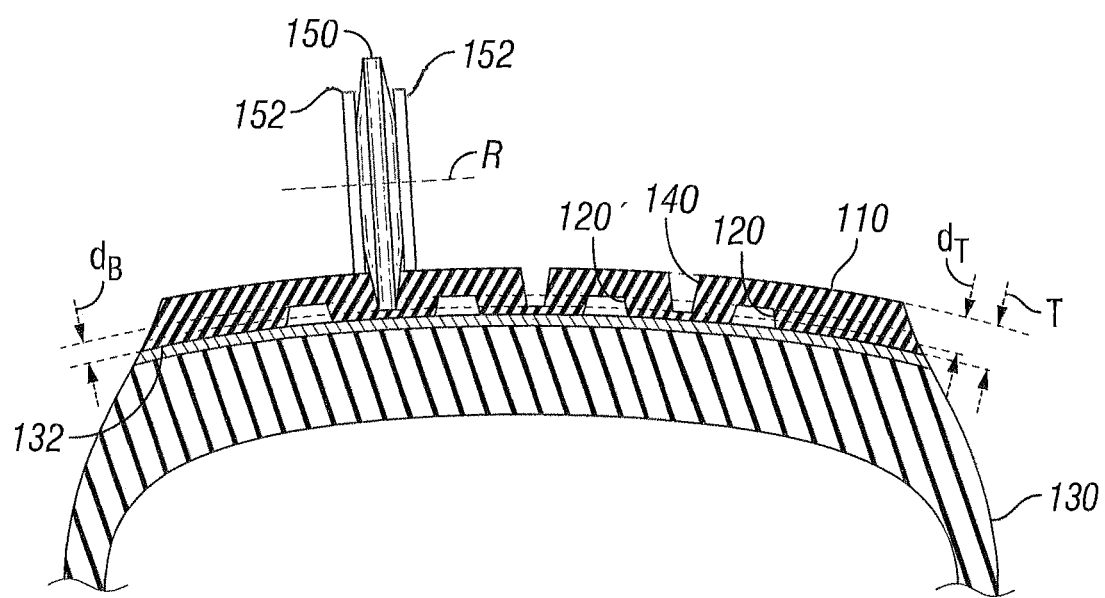
FIG. 4 is a front cross-sectional view of the assembled retreaded tire of FIG. 3 after undergoing a curing process, where a plurality of voids are being formed along a top side of the tread, in accordance with an embodiment of the invention.

As discussed elsewhere herein, it is understood that any method or mechanism known to one of ordinary skill in the art may be employed for forming the one or more voids by removing material from the cured tread. For example, with reference to the embodiment of FIG. 4, a plurality of voids 140 comprising longitudinal grooves are formed along the top side 114 using a material removal member 150 comprising a rotational abrading member. As discussed elsewhere herein, the abrading member outer circumference may include abrasive material or one or more abrasion features. In particular embodiments, for example, abrasive material comprises silica. In further embodiments, for example, each of the one or more abrasion features comprise a protrusion, edge, or a cutting edge or blade. It is appreciated that the material removal member may be employed in any manual or automated material removal process.

Figure 6:
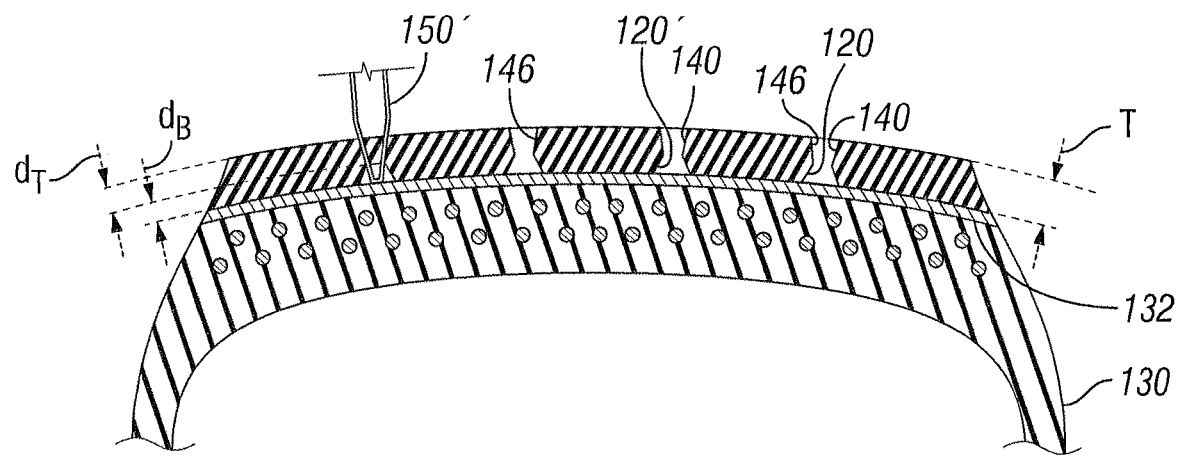
FIG. 6 is a front cross-sectional view of a retreaded tire after formation of voids in the top side, where the top side voids are aligned overtop the submerged voids in accordance with an alternative embodiment of the invention.

In another exemplary embodiment shown in FIG. 6, a non-rotational material removal member 150' is shown. The removal member comprises a cutting blade that slices through the tread material. In certain embodiments, to assist in the cutting operation, the cutting blade is heated, while in other embodiments, the blade may be agitated such as by inducing vibration energy into the blade.

To control the depth of the top side void formed by a material removal member, one or more depth control members may be employed. A depth control member may comprise any structure suitable for, and configured for, controlling the depth of void formation. For example, in FIG. 4, a pair of depth control members 152 are configured to control the depth by which the material removal member 150 forms a void along the top side 114. In the embodiment shown, the depth control members 152 each comprise a rotatable member, such as a disk or roller. The depth control members 152 shown rotate coaxially with the abrading member 150 along a common rotational axis R. In other embodiments, any rotational depth control member 152 may rotate about an axis separate from the rotational axis of a rotational material removal member 150.

It is appreciated that a depth control member may control the depth in any manner. For example, in lieu of the control member moving along the tread by way of rotation, the control member may translate along the tread by a sliding motion. It is also appreciated that any depth control member may be adjustable—such as by adjusting its position, size, or by substitution (where a different depth control member is employed) to adjust the depth by with the material removal member forms the void. In the present embodiment, for example, to form voids of different depths, either a rotational material removal member having a different outer diameter may be substituted or a depth control member having a different outer diameter may be substituted for each of the depth control members present. In other embodiments, however, the depth control maybe achieved by other means or mechanisms. For example, a rotatable member independent of the material removal member may be extended or retracted relative the tread by any adjustment member, such as by an actuator, a powered cylinder, a screw-drive, a selectively adjustable track, or a telescopic arm, for example.

Figure 7:
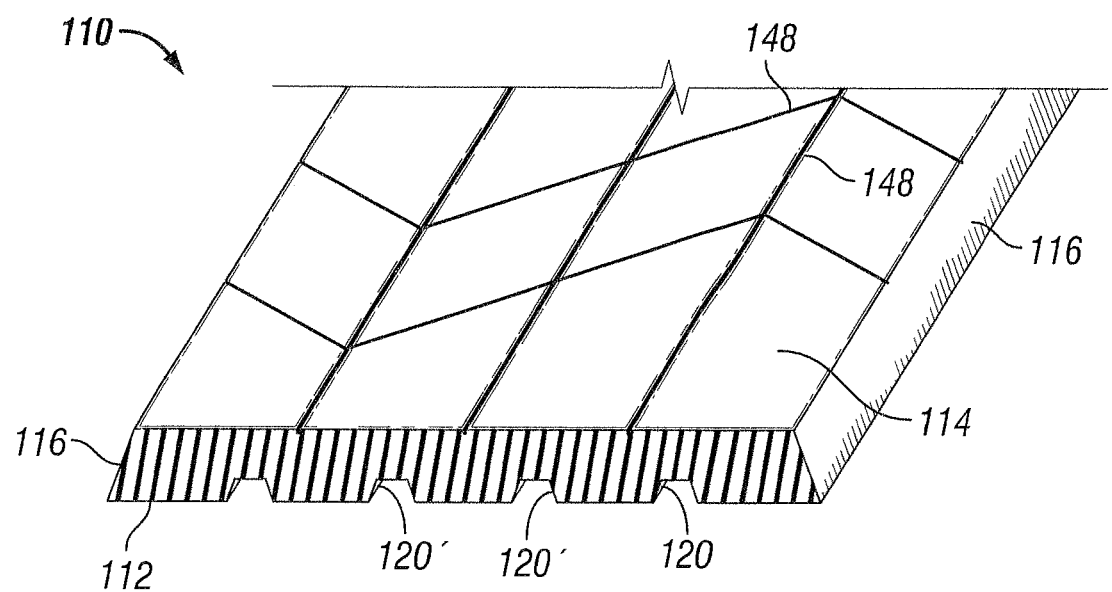
FIG. 7 is a perspective top view of the pre-cured tire tread of FIG. 2, in accordance with an embodiment of the invention.

According to further improvements, the top side may include one or more indicators for determining the location for forming the voids along the top side in the step of forming the top voids. In particular embodiments, these indicators comprise shallow voids, such as, for example, a void extending from the top side and into the tread thickness to a depth of 3 mm or less, 2 mm or less, or 1 mm or less. Additionally, or in the alternative, an indicator may include a marking, such as a surface texture or a color different from a color of the tread material, to indicate a desired or predetermined location for forming a top side void. It is appreciated that a shallow void or marking may comprise an etching. The indicator may not only indicate the location, but the width, length, and or type of void to be formed (such as a sipe or groove). With reference to an exemplary embodiment in FIG. 7, the top side 114 of the tread 110 is shown to include shallow voids or markings 148 comprising etchings, which denote locations for forming longitudinal and lateral grooves shown in FIG. 5, for example. Surface etchings may be formed by any known operation or device, such as by using a rotary abrading or cutting member or a laser.

It is appreciated that formation of the voids along the top side of the tread, as well as any indicators, may be formed by any manual or automated process or machine, of which may contain a processor and memory storage device configured storing instructions for performing the method steps discussed and contemplated herein.

The present invention may be utilized in association with retreaded tires, and in particular for heavy duty trucks and trailers. Heavy duty truck tires include steer and drive tires and trailer tires. Nevertheless, the present invention may be utilized in association with any type of tire to form new or retreaded tire and as such, any type of tire may provide an embodiment of the present invention. Exemplary tire types for use with the subject invention further include light truck tires, off the road tires, bus tires, aircraft tires, bicycle tires, motorcycle tires, and passenger vehicle tires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific embodiment discussed herein may be combined with one or more features of any one or more embodiments otherwise discussed or contemplated herein unless otherwise stated.

What is claimed is:

1. A method of forming a retreaded tire, the method comprising the steps of:
    providing a tire tread, the tire tread having a bottom side configured for bonding to a tire carcass, a top side including one or more indicators for determining a location for forming one or more voids along the top side relative to one or more submerged voids arranged along the bottom side, where each of the one or more indicators is an etching or a shallow void extending from the top side towards the bottom side to a depth of 3 mm or less, the top side configured for engaging a ground surface, a thickness extending between the top side and the bottom side, and a pair of opposing lateral sides defining a width of the tread, the top side being free of any exposed voids forming a groove having a width greater than 3 millimeters or a depth greater than 3 millimeters, the one or more submerged voids extending from the bottom side into the tread thickness to form a tread pattern, each of the one or more submerged voids having a depth less than the thickness and each of the one or more submerged voids also being configured to be exposed along the top side when a tire is in a worn configuration during a useful life of the tire tread;
    applying the tire tread to a tire carcass, where a layer of bonding material is arranged between the tire tread and the tire carcass;
    bonding the tire tread to the tire carcass;
    determining each location for forming each of the one or more voids along the top side, where each location for forming each of the one or more voids along the top side is one of the one or more locations of the one or more indicators; and,
    forming the one or more voids into the tread thickness along the top side of the tread at the one or more locations of the one or more indicators after the step of bonding.

2. The method of claim 1, where the top side is free of any exposed voids separate from any of the one or more indicators.

3. The method of claim 1,
    where the step of providing a tire tread comprises molding the tire tread, such that the one or more submerged voids are molded into the tread thickness from the bottom side to form the tread pattern.

4. The method of claim 1,
    where the one or more submerged voids include one or more lateral submerged voids extending in a direction of the tread width from at least one of the lateral sides of the tread, such that the one or more lateral submerged voids is in fluid communication with an exterior of the tread.

5. The method of claim 4,
    where the one or more submerged voids further includes one or more longitudinal submerged voids extending in a direction of a tread length.

6. The method of claim 5,
    where the one or more longitudinal submerged voids and the one or more lateral submerged voids are grooves.

7. The method of claim 5,
    where the longitudinal submerged voids and the lateral submerged voids form a tread pattern of submerged voids defining a void ratio and a contact surface area at a particular worn layer of the tread thickness.

8. The method of claim 1,
    where the step of bonding the tire tread to the tire carcass is performed by arranging a curing membrane at least partially around the assembled retreaded tire such that the curing membrane extends along the top side of the tread.

9. The method of claim 1,
    where the step of forming one or more voids into the tread thickness along the top side of the tread is performed by removing a tread material from the tire tread by an abrading or cutting operation.

10. The method of claim 1, where the step of forming one or more voids into the tread thickness along the top side of the tread is performed by a manual process.

11. The method of claim 1, where the one or more voids formed along the top side are arranged overtop and intersect the one or more submerged voids to each form a combined, full-depth void.

12. The method of claim 1, where the one or more voids formed along the top side are misaligned relative to at least one of the one or more submerged voids along the bottom side.

13. A tire tread for retreading a tire carcass, the tire tread comprising:
a bottom side configured for bonding to a tire carcass;
a top side configured for engaging a ground surface, the top side being free of any exposed voids comprising a groove having a width greater than 3 millimeters or a depth greater than 3 millimeters, the top side including one or more indicators for determining a location for forming the one or more voids along the top side relative to one or more submerged voids arranged along the bottom side, where each of the one or more indicators is an etching or a shallow void extending from the top side towards the bottom side to a depth of 3 mm or less;
a thickness extending between the top side and the bottom side;
a pair of opposing lateral sidewalls defining a width of the tread; and
one or more submerged voids extending into the tread thickness from the bottom side into the tread thickness to form a tread pattern, each of the one or more submerged voids having a depth less than the thickness of the tire tread, each of the one or more submerged voids also being configured to be exposed along the top side of the tread of a tire when the tire is in a worn configuration during a useful life of the tire tread.

14. The tire tread of claim 13, where each of the one or more indicators is a surface marking arranged along the top side.

15. The tire tread of claim 14, where the surface marking comprises a color different from a color of an elastomeric material forming the tread thickness.

16. The method of claim 1, where the step of forming one or more voids into the tread thickness along the top side of the tread is performed by an automated process.

17. The method of claim 12, where in forming the one or more voids misaligned relative to at least one of the one or more submerged voids, at least one void of the one or more voids intersect at least one submerged void of the one or more submerged voids.

18. The method of claim 17, where the at least one submerged void intersected by the at least one void is not in fluid communication with a lateral side of the tread.

19. The method of claim 1, where the one or more indicators identify a type of void to be formed or a width and/or depth of the void to be formed.

* * * * *